United States Patent [19]
Pfister

[11] 3,929,890
[45] Dec. 30, 1975

[54] PROCESS FOR THE PREPARATION OF A HYDROLYZATE OF PROTEINS FOR USE AS A FOODSTUFF
[75] Inventor: Bernard Pfister, Lucens, Switzerland
[73] Assignee: Union Laitiere Vaudoise, Switzerland
[22] Filed: Jan. 24, 1973
[21] Appl. No.: 326,162

[30] Foreign Application Priority Data
Jan. 27, 1972 Switzerland................ 1219/72

[52] U.S. Cl............. 426/580; 260/112 R; 260/119; 260/121; 260/123.5; 426/656; 426/657
[51] Int. Cl.²........................................ A23J 3/00
[58] Field of Search .......... 426/364, 212, 656, 657, 426/580; 260/112 R, 119, 121, 123.5

[56] References Cited
UNITED STATES PATENTS
2,049,576  8/1936  Ungnade................ 426/364 X
2,953,456  9/1960  Mohler et al. ................ 426/212 X
3,391,001  7/1968  Sair.................... 426/212

Primary Examiner—James R. Hoffman
Attorney, Agent, or Firm—Robert E. Burns; Emmanuel J. Lobato; Bruce L. Adams

[57] ABSTRACT

A hydrolyzate of proteins for use as a foodstuff is prepared by boiling a mixture of 62 parts by weight of water, 92 parts of hydrochloric acid of density 1.17, and 70 parts of casein or soya proteins for about 18 to 20 hours. The mixture is then cooled to a temperature of 28°–32°C and a base, eg 105–115 parts by weight of a 30% aqueous solution of pure sodium hydroxide, is progressively added to bring the pH of the mixture to 6.5–6.7. After cooling to 15°–25°C, the mixture is centrifuged and the clear filtrate dried to provide a powdered final product.

7 Claims, No Drawings

PROCESS FOR THE PREPARATION OF A HYDROLYZATE OF PROTEINS FOR USE AS A FOODSTUFF

The invention concerns a process for the preparation of a hydrolyzate of proteins for use as a foodstuff.

According to the invention, such a process comprises: providing a mixture of water, purified arsenic-free hydrochloric acid of density approximately 1.17 and proteins in a proportion by weight of approximately 9:13:10; boiling said mixture for several hours; neutralizing the mixture by the addition of a base; and filtering the neutralized mixture to separate the clear filtrate.

In a preferred manner of carrying out this process, said mixture comprises, by weight, 62 parts of water, 92 parts of hydrochloric acid of density 1.17, and 70 parts of proteins; said mixture is boiled for a period of from 18 to 20 hours and cooled to a temperature range between about 28° and 32°C; 105 to 115 parts by weight of sodium hydroxide in the form of a 30% aqueous solution are added progressively to bring the pH of the mixture to a value between 6.5 and 6.7 while maintaining the mixture at a temperature in the range from about between 28° and 32°C; and the mixture is cooled to a temperature in the range from about 15° to about 25°C and filtered to separate the clear filtrate.

The starting material can include animal proteins such as albumin and casein, or protein sources such as soya or brewers' yeast. Proteins of micro-biological origin, other than brewers' yeast, may also be employed.

If it is desired that the hydrolyzate does not contain sodium ions, for example when the product is to be used as a dietetic salt-free foodstuff, neutralization of the mixture may be carried out by means of calcium or magnesium hydroxide rather than sodium hydroxide.

The clear filtrate obtained, which may be consumed in this liquid form, is advantageously dried, possibly with simultaneous pulverization, so as to provide a product in the form of a powder which is readily soluble in water.

Examples of the process according to the invention will now be described in detail.

In a first example, the proteins used as starting material consist of a milk casein having a composition with the following characteristics:

| | |
|---|---|
| Water | 10–12% |
| Nitrogenous compositions | 81–85% |
| Soluble nitrogenous compositions | less than 0.2% |
| Fatty matters | maximum 1.75% |
| Lactose | Traces |
| Ashes | 0.1–1.0% |
| Total acidity for 1 g (neutralized by) | 9–13 ml 0.1-NaOH |
| Available or free acidity | less than 0.2%, | all percentages being by weight. The casein has a granulation such that less than 10% is retained by a 30 mesh screen and less than 80% by a 100 mesh screen. The total number of bacteriological germs is less than 50,000/g.

70 kg of this casein is mixed with 62 l of water and 92 kg of purified arsenic-free hydrochloric acid having a density of 1.17 and a concentration of about 34%, in a reaction vessel, formed for example of a quartz vat, equipped with a stirrer, a condenser, and a heating jacket. While stirring, the mixture is boiled until the casein is fully broken down, which takes about 18 to 20 hours.

The acidic hydrolyzate mixture is then transferred to a cooling and neutralization vessel where it is cooled to a temperature between about 28° and 32°C. While maintaining the mixture within this temperature range, 105–115 kg of pure sodium hydroxide in the form of a 30% aqueous solution is gradually added to bring the pH of the mixture to a value between 6.6 and 6.7.

After cooling the neutralized mixture to a temperature range of between about 15° to 25°C, it is centrifuged and the clear filtrate is collected.

Filtration of the mixture could also be carried out continuously by means of a filter press or other separating device with the addition of infusorial earth to the mixture being filtered.

The filtrate obtained is preferably dried in a drying tower at a temperature of between 95° and 100°C by means of dry, hot air introduced at a temperature between 205° and 214°C, so as to obtain a dry powder which is readily soluble in water. Drying can be carried out with simultaneous pulverization of the product by means of a pulverizing or atomizing pump supplying a pressure of 8 to 15 kg/cm$^2$.

By adjusting the temperature and pressure of the dry air introduced into the drying tower, it is possible to adjust the moisture content of the final product within a wide range of values, and to maintain the moisture at a constant value.

In this manner it is possible to provide a dry final product having the following composition, in percentage by weight:

| | |
|---|---|
| Moisture | 2.5 – 2.6 % |
| Amino acids | 53.5 – 53.7 % |
| Fatty matters | 0.1 – 0.2 % |
| Carbohydrates | zero |
| Sodium chloride | 41 – 41.5 % |
| other minerals | 2 – 2.5 % |

The amino acid content of this product is, expressed as a percentage of the total weight of the product:

| | |
|---|---|
| Phosphoserine | 0.20 % |
| Aspartic acid | 4.21 % |
| Threonine | 2.29 % |
| Serine | 3.09 % |
| Proline | 6.64 % |
| Glutamic acid | 13.79 % |
| Glycine | 0.96 % |
| Alanine | 1.76 % |
| Valine | 3.25 % |
| Methionine | 0.86 % |
| Isoleucine | 1.10 % |
| Leucine | 1.37 % |
| Tyrosine | 0.80 % |
| Phenylalanine | 2.47 % |
| Ammonia | 0.76 % |
| Lysine | 4.74 % |
| Histidine | 1.33 % |
| Arginine | 3.88 % |
| | 53.50 Total Amino Acid |

Using soya as the starting product, a similar final product can be obtained as follows. 70 kg of pure soya proteins are mixed in a reaction vessel with 60 to 62 l of water and 92 kg of purified arsenic-free hydrochloric acid having a density of 1.17 and a concentration of about 34%, and the mixture is boiled for 18 to 20 hours while stirring. The mixture is then cooled to 28°–32°C and neutralized by the addition of 105 to 115 kg of pure sodium hydroxide in the form of a 30% aqueous solution to bring the pH of the mixture to a value comprised between 6.5 and 6.7. The mixture is then further cooled to between 15° and 25° C and centrifuged. The separated clear filtrate is dried at a temperature between 95° and 100°C in a drying tower by the introduction of dry air at a temperature between 205° and 214° C.

An advantage of the described process of hydrolyzation of proteins, in particular milk and soya proteins, by chemical hydrolysis to provide a hydrolyzate which can be used as a foodstuff is that the reaction can be easily and safely controlled in a manner to provide a final product having a precisely constant composition.

Neutralization of the acidic reaction mixture by means of sodium hydroxide provides an end product having a high common salt content. This product, which is easily assimilable, can be used to stimulate the appetite and to compensate for loss of salt by transpiration during or after an intense physical effort.

What is claimed is:

1. A process for the preparation of a hydrolyzate of proteins for use as a foodstuff, comprising the steps of: providing a mixture of water, purified arsenic-free hydrochloric acid of density approximately 1.17 and proteins in a proportion by weight of approximately 9:13:10; boiling said mixture for several hours and then cooling to a temperature between 28° and 32°C; neutralizing the mixture by the progressive addition of a base to bring the pH to a value between 6.5 – 6.75 while maintaining said temperature range, then cooling the neutralized mixture to a temperature between 15° and 25°C; filtering the neutralized mixture to separate the clear filtrate and drying said clear filtrate to a solid product.

2. A process according to claim 1, in which said mixture comprises, by weight, 62 parts of water, 92 parts of hydrochloric acid of density 1.17 and 70 parts of proteins; said mixture is boiled for a period of from 18 to 20 hours and in which the base comprises 105 to 115 parts by weight of sodium hydroxide in the form of a 30% aqueous solution.

3. A process according to claim 1, in which said mixture includes at least one animal protein from the group consisting of albumin and casein.

4. A process according to claim 1, in which said mixture includes at least one protein source from the group consisting of soya and brewers's yeast.

5. A process according to claim 1, in which said base is calcium hydroxide.

6. A process according to claim 1, comprising spray drying said clear filtrate.

7. A process according to claim 1, comprising pulverising the filtrate solids during the last stages of drying.

* * * * *